Figure 1:
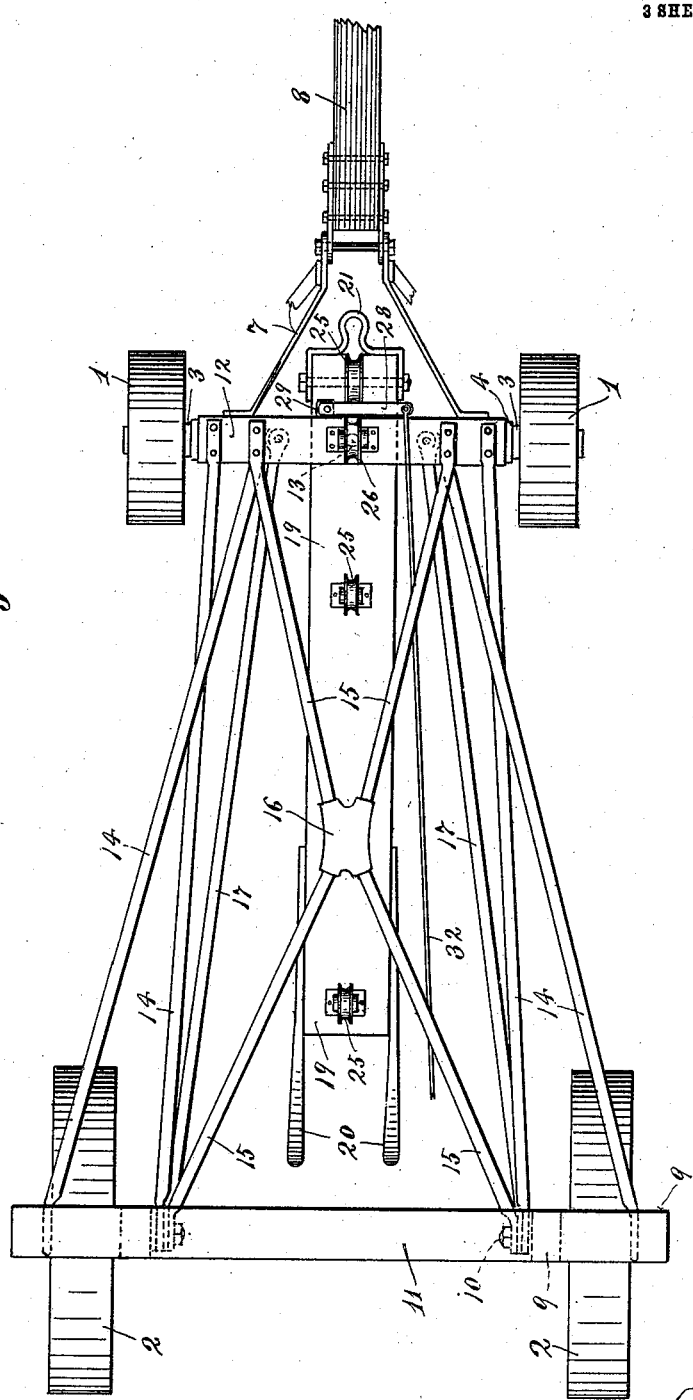

M. D. CROMMETT.
STONE PULLER.
APPLICATION FILED JAN. 26, 1910.

966,528.

Patented Aug. 9, 1910.
3 SHEETS—SHEET 1.

Witnesses.
A. H. Opsahl.
W. H. Souba.

Inventor
M. D. Crommett
By his Attorneys
Williamson Merchant

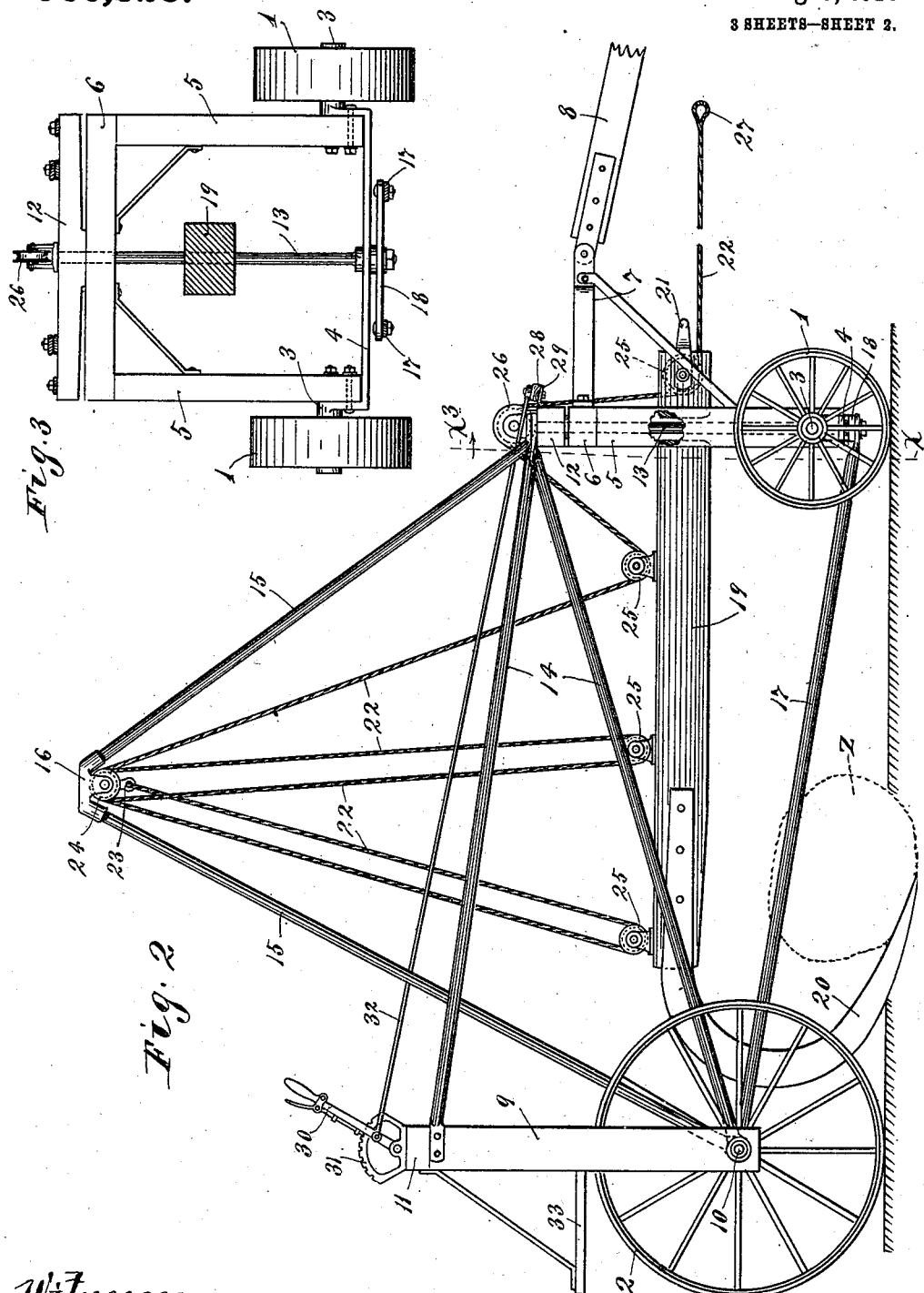

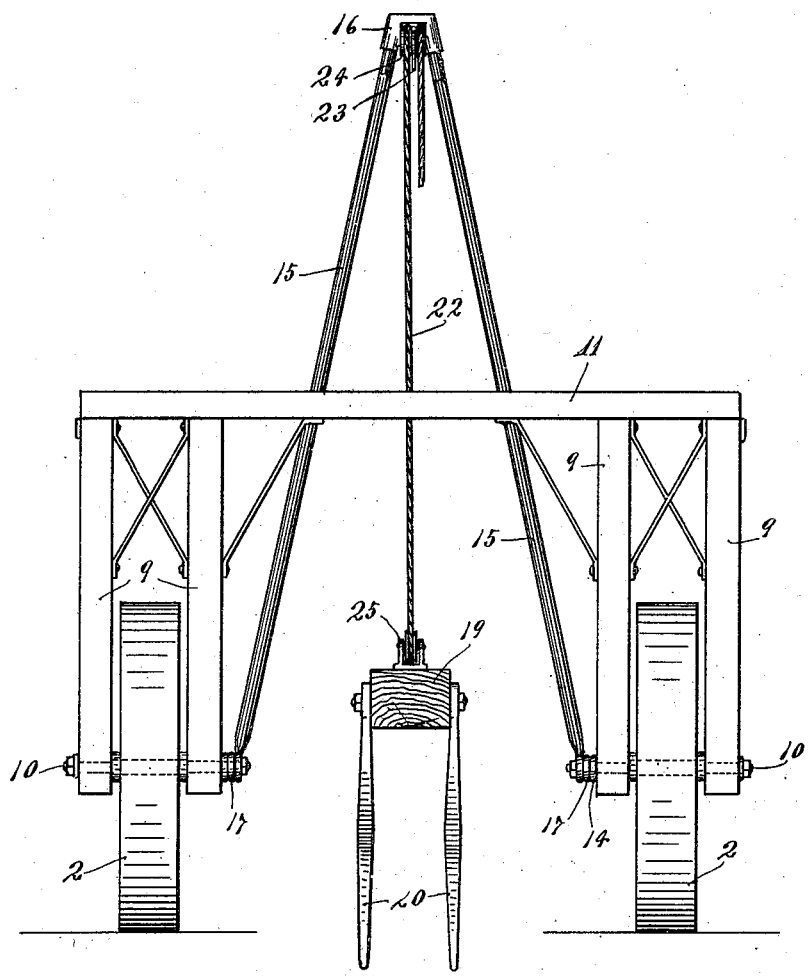

UNITED STATES PATENT OFFICE.

MELVIN D. CROMMETT, OF SPICER, MINNESOTA.

STONE-PULLER.

966,528.  Specification of Letters Patent.  Patented Aug. 9, 1910.

Application filed January 26, 1910. Serial No. 540,131.

*To all whom it may concern:*

Be it known that I, MELVIN D. CROMMETT, a citizen of the United States, residing at Spicer, in the county of Kandiyohi and State of Minnesota, have invented certain new and useful Improvements in Stone-Pullers; and I do hereby declare the following to be a full, clear, and exact description of the invention, such as will enable others skilled in the art to which it appertains to make and use the same.

My invention has for its especial object to provide an improved stone puller or lifting device, and to this end, it consists of the novel devices and combinations of devices hereinafter described and defined in the claims.

In the accompanying drawings which illustrate the invention, like characters indicate like parts throughout the several views.

Referring to the drawings, Figure 1 is a plan view of the improved device, with some parts broken away; Fig. 2 is a view in side elevation of the same, with some parts broken away; Fig. 3 is a view in rear elevation of the front truck with the drag beam shown in sections; and Fig. 4 is a rear end elevation of the improved device with some parts removed.

The numerals 1 and 2 indicate, respectively, the front and rear wheels of a suitable supporting truck. The front truck wheels 1 are journaled on short trunnions 3, and which trunnions, as shown, are secured to and project from a tie bar 4 rigidly secured to the lower ends of a pair of heavy laterally spaced legs 5. At their upper ends, the legs 5 are rigidly secured to a heavy transverse beam 6. The tie bar 4, legs 5 and beam 6 constitute a front truck frame. A pole bracket 7 is secured to the front truck frame and a pole 8 is pivotally secured to the bracket 7.

The rear truck wheels 2 are located between pairs of heavy laterally spaced legs 9 and are journaled on shafts 10 secured to the lower ends of said legs. At their upper ends, the legs 9 are rigidly secured to a heavy transverse beam 11. This beam 11 and legs 9 constitute a rear truck frame.

To the top bar of the front truck frame a front bolster 12 is pivotally mounted on a long king bolt 13, which king bolt, in turn, is mounted in the tie bar 4 and beam 6 of said front truck frame. Upper and lower tie bars 14 are rigidly secured at their forward ends to the front bolster 12 and the rear ends of the upper rods 14 are secured to the upper ends of the legs 9, and the rear ends of the lower rods 14 are secured to the inwardly projecting ends of the short shafts 10.

A derrick frame in the form of a pyramid is made up of four upwardly converging arms 15 secured together at their upper ends, by means of a cap 16. At their lower ends, two of the arms 15 are secured to the front bolster 12, and the lower ends of the other two arms 15 are secured to the inwardly projecting ends of the shafts 10. To brace the lower portion of the front truck bolster, a pair of laterally spaced tie rods 17 are secured at their rear ends to the inwardly projecting ends of the short shafts 10, and their forward ends are secured, one to each end of a spacing bar 18 which is intermediately secured to the depending end of the king bolt 13.

The stone digger proper is in the form of a heavy drag beam 19 having secured, at its rear end, a pair of forwardly and downwardly projecting digging hooks or prongs 20. These digging hooks 20 are laterally spaced apart, one from the other, by securing one on each side of the drag beam 19. Near its forward end, the drag beam 19 is loosely secured to the king bolt 13 for both pivotal and vertically sliding movements and at its extreme forward end is provided with a clevis 21 to which draft animals may be attached for the purpose of drawing the truck and the stone pulling device. The drag beam 19 is supported from the derrick frame by means of a derrick cable 22 that is attached at one of its ends to a depending arm 23 on the under side of the cap 16. The intermediate portion of the cable 22 runs over a double sheave 24 mounted on the under side of the cap 16, under sheaves 25 secured to the beam 19 and over a guide sheave 26 mounted on the front bolster 12. At its free end, the cable 22 is provided with a ring or loop 27 to which draft animals may be attached for raising the drag beam 19. For the purpose of holding the drag beam 19 in an elevated position, a suitable brake is provided in the form of a horizontally extended lever 28 pivotally connected at one of its ends to a bracket 29 secured to the front of the bolster 12 and the lever 28 extends on both sides of the cable 22. On the upper surface of the rear truck frame is mounted a latch lever 30 and coöperating latch segment 31, and a connecting rod 32 connects the latch lever 30 with the free end of the brake lever 28. By reference to Figs. 1 and 2, it will be noted that the cable 22 runs between the front bolster 12 and the brake lever 28 and by drawing the latch lever 30 toward the operator, the cable 15 will be pinched between the brake lever 28 and front bolster 12. To the rear portion of the rear truck frame is secured a platform 33 on which the operator of the machine may stand.

The operation of the stone puller may be briefly stated as follows: As the truck is moved from place to place, the drag beam 19 will be raised to a sufficient height, so that the digging hooks will clear the ground. The drag beam 19 is held in this elevated position by the brake 28. To lift a stone, as indicated by the letter Z in Fig. 2, to the surface of the ground, the brake 28 is first released and the drag beam 19, under the action of gravity, will be lower and the weight of this drag bar 19 and digging hooks 20 will cause the hooks 20 to enter the ground. The truck is then advanced by the draft animals until the free ends of the digging hooks are under the stone Z, at which time the truck is stopped and the draft animals attached to the derrick cable 22 are allowed to advance. Under the drawing action of the cable 22, the front end of the drag bar 19 will first slide upward on the king bolt 13 until stopped by the beam 6 of the front truck frame, owing to the weight of the stone Z on the digging hooks 20. Then the rear end of the beam 19 will be raised and the stone Z on the digging hooks 20 will be lifted above the surface of the ground. The truck may now be advanced in order to carry the stone away from the hole in which it was deposited, and under the continued upward movement of the beam 19, the stone Z will be rolled off from the digging hooks 20 onto the ground when it may be placed on a stone boat and removed to any desired place. In gathering comparatively small stones, it would not be necessary to stop the advance of the truck when a stone is engaged by the digging hooks. Stones that are not in sight may be brought to the surface of the ground by letting the digging hooks 20 drag through the ground.

What I claim is:

1. In a device of the kind described, the combination with a truck, of a drag bar connected at its front end to said truck for both pivotal and sliding movements, a digging hook secured to the free end of said drag bar, a derrick mounted on said truck, guide sheaves mounted on said truck, drag bar and derrick, a hoisting cable for coöperation with said sheaves for supporting said drag bar from both said derrick and said truck in different angular adjustments, and independent draft devices adapted to be attached to said drag bar and said hoisting cable, substantially as described.

2. In a device of the kind described, the combination with a truck including a front bolster and an equalizing bar vertically spaced one above the other, tie bars rigidly supported to the same from the rear truck frame, a king bolt mounted in and connecting said front bolster and equalizing bar, and a front truck frame pivotally mounted on said king bolt between said front bolster and said equalizing bar, of a digging hook connected to said king bolt for both pivotal and swinging movements, and means for raising and lowering the same, substantially as described.

3. In a device of the kind described, the combination with a truck, of a digging hook connected to the king bolt of said truck for both pivotal and sliding movements, a derrick mounted on said truck, a cable connecting said digging hook and derrick, a brake for action on said cable, and independent draft devices adapted to be attached to said digging hooks and to said cable, substantially as described.

In testimony whereof I affix my signature in presence of two witnesses:

MELVIN D. CROMMETT.

Witnesses:
T. O. GILBERT,
CHARLES JOHNSON.